(12) United States Patent
Berben et al.

(10) Patent No.: US 9,062,847 B2
(45) Date of Patent: Jun. 23, 2015

(54) METHOD FOR MANUFACTURING A PHOSPOR DEVICE AND LIGHTING APPARATUS COMPRISING SUCH PHOSPHOR DEVICE

(75) Inventors: Dirk Berben, Herdecke (DE); Ulrich Hartwig, Berlin (DE); Nico Morgenbrod, Berlin (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/111,181

(22) PCT Filed: Apr. 13, 2011

(86) PCT No.: PCT/EP2011/055851
§ 371 (c)(1),
(2), (4) Date: Nov. 25, 2013

(87) PCT Pub. No.: WO2012/139644
PCT Pub. Date: Oct. 18, 2012

(65) Prior Publication Data
US 2014/0126179 A1     May 8, 2014

(51) Int. Cl.
*F21V 9/00* (2006.01)
*C25D 13/12* (2006.01)
*H04N 9/31* (2006.01)
*G02B 27/09* (2006.01)

(52) U.S. Cl.
CPC *F21V 9/00* (2013.01); *H04N 9/315* (2013.01); *G02B 27/0994* (2013.01); *C25D 13/12* (2013.01)

(58) Field of Classification Search
USPC .................. 362/84, 612, 555; 353/20, 84, 94
See application file for complete search history.

(56) References Cited

U.S. PATENT DOCUMENTS

| 4,482,447 A | 11/1984 | Mizuguchi et al. |
| 6,686,581 B2 * | 2/2004 | Verhoeckx et al. ....... 250/214 R |
| 7,543,959 B2 | 6/2009 | Bierhuizen et al. |
| 2007/0146639 A1 | 6/2007 | Conner |

FOREIGN PATENT DOCUMENTS

WO     2009105198 A2     8/2009

* cited by examiner

*Primary Examiner* — Tracie Y Green

(57) ABSTRACT

A method for manufacturing a phosphor device may include: providing an optical transmitting member having a first end face and a second end face, whereby the optical transmitting member is designed for guiding exciting light entering through the first end face onto a phosphor layer arranged on the second end face, whereby at least a part of the exciting light is being wavelength-converted by the phosphor layer, and whereby the optical transmitting member is further designed for at least partially collecting and guiding the light converted by the phosphor layer; attaching an optically transparent electrode on the second end face of the optical transmitting member; providing a phosphor and a counter-electrode designed for electrophoretic deposition of the phosphor; and depositing a phosphor layer on the optically transparent electrode by means of electrophoretic deposition, thereby using the optically transparent electrode as a coating electrode.

16 Claims, 3 Drawing Sheets

METHOD FOR MANUFACTURING A PHOSPOR DEVICE AND LIGHTING APPARATUS COMPRISING SUCH PHOSPHOR DEVICE

RELATED APPLICATIONS

This application is a national stage entry according to 35 U.S.C. §371 of PCT application No.: PCT/EP2011/055851 filed on Apr. 13, 2011.

TECHNICAL FIELD

Various embodiments relate to a phosphor device, particularly to a method for manufacturing a phosphor device. Furthermore, Various embodiments relate to a lighting apparatus including such phosphor device.

BACKGROUND

Phosphor devices are used in lighting apparatus wherein the phosphor (component or mixture), i.e. a substance with wavelength-converting properties, e.g. a fluorescent or luminescent substance, is remote from the exciting light source. Therefore, they are also called remote phosphor devices. Remote phosphor devices can be used in various lighting applications, e.g. in RGB projection equipment, generating red (R), green (G) and blue (B) light for coloured video projection. Other possible lighting applications include medical, architectural or entertainment lighting with coloured or white light.

In prior art remote phosphor devices, such as phosphor wheels or LED based illumination devices, a carrier plate or an optical transmitting member is coated with phosphor. The phosphor is excited by exciting light, e.g. visible blue laser light (450 nm), impinging on the phosphor layer. The exciting laser light is wavelength-converted by the phosphor to generate light with longer wavelengths (e.g. broad spectral distribution with a peak at approximately 520 nm for green light).

The wavelength-converted light from the phosphor is collected by an optical transmitting member, e.g. an optical collimator such as a lens made of glass or a compound parabolic concentrator (CPC) or a compound elliptical concentrator (CEC) etc., arranged in front of the phosphor.

In U.S. Pat. No. 7,543,959 an illumination system including a light source and an optical concentrator coated with phosphor is disclosed. Exiting light from the light source, e.g. a light emitting diode (LED), enters the optical concentrator on its larger end face and is concentrated towards its smaller end face. The smaller end face is coated with a phosphor layer, which is exited by the concentrated exiting light. The exiting light is wavelength-converted by and transmitted through the phosphor layer ("transmissive mode" phosphor device).

SUMMARY

Various embodiments provide a method for manufacturing a phosphor device.

Various embodiments provide a method for manufacturing a phosphor device including the steps: providing an optical transmitting member having a first end face and a second end face, whereby the optical transmitting member is designed for guiding exciting light entering through the first end face onto a phosphor layer arranged on the second end face, whereby at least a part of the exciting light is being wavelength-converted by the phosphor layer, and whereby the optical transmitting member is further designed for at least partially collecting and guiding the light converted by the phosphor layer; attaching an optically transparent electrode on the second end face of the optical transmitting member; providing a phosphor and a counter-electrode designed for electrophoretic deposition of the phosphor; depositing a phosphor layer on the optically transparent electrode by means of electrophoretic deposition (EPD), thereby using the optically transparent electrode as a coating electrode.

Furthermore, protection is sought for a lighting apparatus including the phosphor device manufactured according to the disclosure.

In the context of the disclosure the term phosphor denotes any wavelength-converting substance such as a fluorescent or phosphorescent material. Furthermore, the phosphor may also include more than one phosphor component, i.e. may be a mixture of two or more phosphor components.

According to the disclosure, the phosphor layer of a phosphor device is deposited on the coating electrode attached to its optical transmitting member by virtue of electrophoretic deposition (EPD). The thickness of the phosphor layer, which is relevant to the efficiency of the phosphor device, can be controlled precisely by the EPD process. The concept of coating the phosphor directly onto a coating electrode of the optical transmitting member facilitates dissipation of the heat generated by the exciting light when impinging on the phosphor layer, because there is no air gap preventing the effective transfer of heat to the optical transmitting member. For improved heat dissipation the optical transmitting member may preferably include a thermally conductive though optically transparent material, e.g. $Al_2O_3$, $YVO_4$, YLF or sapphire.

The coating electrode for depositing the phosphor layer must be transparent for the exciting light in order to enable the exciting light, guided by and leaving the optical transmitting member through its second end face, to pass the coating electrode and impinge on the phosphor layer. An appropriate coating electrode may be achieved by coating a transparent, electrically conductive layer on the outer surface of the second end face of the optical transmitting member. The electrically conductive layer may include tin oxide (TO), indium tin oxide (ITO), aluminium zinc oxide, a metal mono layer or graphene. Since very small current densities, typically several $mA/mm^2$ are sufficient for the deposition of the phosphor layer, the thickness of the electrically conductive layer may typically be in the range of several nm to several tenth of nm. Alternatively, an appropriate optically transparent electrode may be achieved by placing a wire mesh on the second end face of the optical transmitting member. Because the coating electrode has to support only small currents during deposition of the phosphor, the wire diameter can be sufficiently small to facilitate appropriate mesh size and, hence, transparency.

The optically transparent coating electrode may also be separated into adjacent, separately controllable coating electrode zones, resulting in separated, adjacent phosphor zones. By virtue of this measure, different phosphor components, e.g. a red (R), a green (G) and a blue (B) light emitting phosphor may be subsequently deposited on respective electrode zones. When excited with ultraviolet (UV) radiation, for example, the converted red, green and blue light fractions may be collected and mixed by the optical transmitting member, resulting in mixed white light.

The phosphor may be deposited on the transparent coating electrode by standard aqueous EPD with the phosphor suspended in water. This coating bath may be hold in a container also serving as the counter-electrode. By applying a DC voltage between the coating electrode and the counter-electrode, a phosphor layer is deposited on the transparent coating electrode while being submerged into the coating bath.

The optical transmitting member may be designed for transmitting light and, as the case may be, for mixing fractions of light of different colour by way of total internal reflection (TIR) between its first end face and second end face. For this purpose, the optical transmitting member may be elongated and have a polygonal cross section, particularly a triangular, rectangular or hexagonal cross section.

The method for manufacturing a phosphor device according to the disclosure may further include the step of arranging a reflective means on the back side of the phosphor layer, i.e. reverse to the side facing the optically transparent electrode and, likewise, reverse to the side facing the impinging exciting light. Preferably, the reflective means includes $TiO_2$, because its reflectivity for light is approximately 98%, which is remarkably high compared to 88-90% of a typical aluminium mirror. Due to this measure the light converted by the phosphor layer is effectively reflected towards the optically transparent electrode and, hence, the second end face of the optical transmitting member. The optical transmitting member collects the converted light through its second end face and guides it to its first end face for further use.

To further improve heat dissipation a heat sink may be attached to the back side of the phosphor layer by virtue of a heat transfer paste. Preferably, the heat transfer paste may contain $TiO_2$ as filler to add diffuse reflective properties to the paste.

The phosphor device manufactured according to the disclosure may be part of a lighting apparatus, further including at least one exciting light source, e.g. a laser, preferably a laser diode or a laser diode array, for emitting exciting light. The phosphor device and the exciting light source are arranged such that the exciting light is enabled to enter the phosphor device through the first end face of the optical transmitting member. After passing through the second end face of the optical transmitting member and the optically transparent electrode, the exciting light impinges on the phosphor layer where it is at least partially being wavelength-converted by the phosphor. The wavelength-converted light is collected and mixed (spatially and, as the case may be, in terms of colours) by the optical transmitting member after entering its second end face. Finally, the mixed light leaves the optical transmitting member through the first end face. The mixed light may be guided and shaped by additional optical devices for further use in various applications. Further details will be explained in the description of the drawings.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
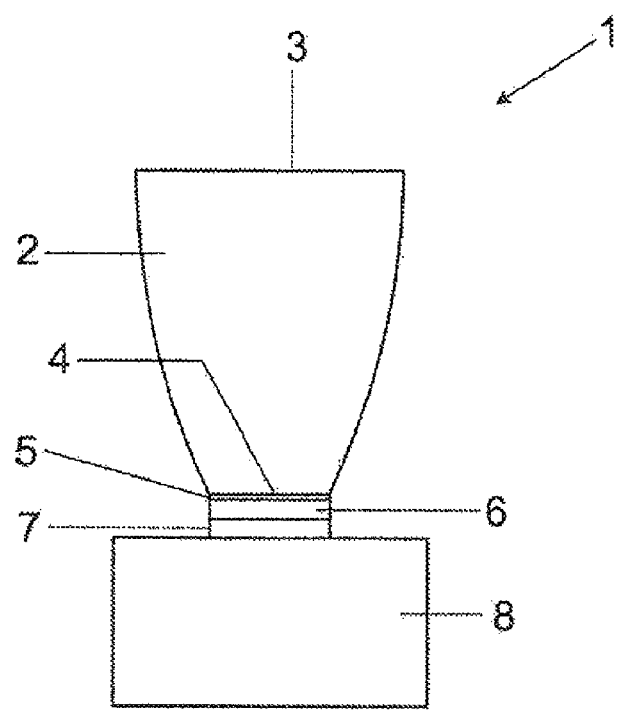
FIG. 1 is a side view of an embodiment of a phosphor device manufactured according to the disclosed embodiment.

FIG. 1 schematically shows an embodiment of a phosphor device 1 manufactured according to the present invention. The phosphor device includes an elongated optical transmitting member 2 having a first end face 3 and a second end face 4, a transparent coating electrode 5 attached on the outer surface of the second end face 4, a phosphor layer 6 deposited on the transparent electrode 5, a reflective means 7 attached on the back side of the phosphor layer 6 and a heat sink 8 coupled to the reflective means 7.

Figure 2A:
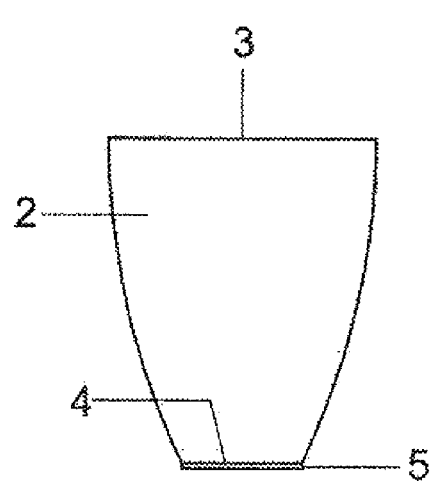
FIG. 2A is a side view of an optical transmitting member including an optically transparent electrode.
Figure 2B:
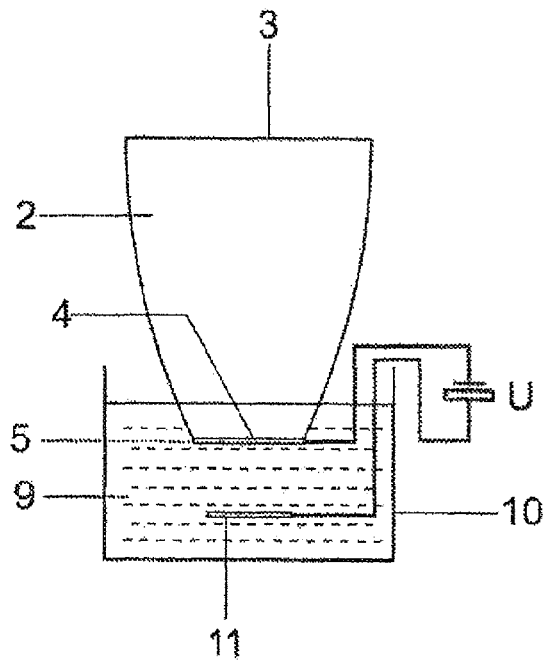
FIG. 2B is a schematic view of the optical transmitting member shown in FIG. 1 and submerged into an EPD bath.
Figure 2C:
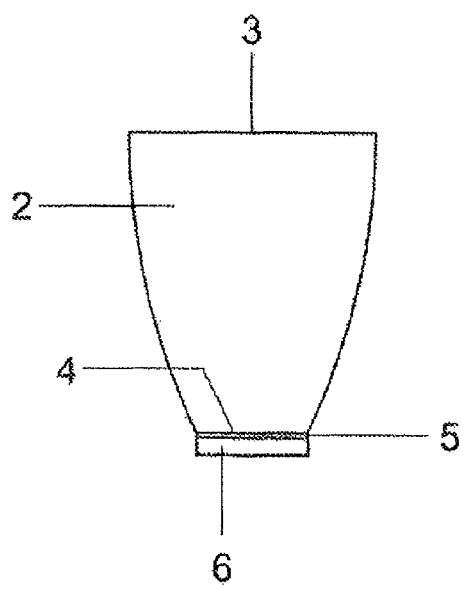
FIG. 2C shows the optical transmitting member after the phosphor layer is applied by means of EPD.

The manufacturing of the phosphor device shown in FIG. 1 is explained with reference to the FIGS. 2a-2c, showing different steps of the manufacturing. The same reference numerals are used for the same or similar features.

In FIG. 2A the optical transmitting member 2 is shown. It is formed as a CPC with a hexagonal cross section and is made of solid $YVO_4$, because of its superior optical as well as thermal properties. The thermal properties of $YVO_4$ facilitate heat transfer from the phosphor layer while being excited by exciting light. Of course, other material with similar optical and thermal properties could be used. The second end face 4 of the optical transmitting member 2 is being coated with a transparent indium tin oxide (ITO) layer 5 of less than 100 nm thickness.

Next, the electrophoretic deposition (EPD) of the phosphor layer is explained. As schematically shown in FIG. 2B the second end face 4 of the optical transmitting member 2 is submerged into a coating bath 9 held by a container 10. The coating bath 9 includes a suspension of a phosphor, e.g. the yellow light emitting phosphor $(Y_{0.96}Ce_{0.04})_3Al_{2.25}Ga_{1.25}O_{12}$. The ITO layer 5 is connected to a DC voltage source U designed for generating an electrical field of typically several V/mm to several hundred V/mm, thereby serving as the transparent coating electrode of the EPD process. A counter-electrode 11 submerged into the coating bath 9 and arranged opposite to the coating electrode 5 is also connected to the DC voltage source U. The counter-electrode 11 has the same shape as the coating electrode 5, but is of smaller size to reduce inhomogeneity of the electrical field and, hence, avoid increased phosphor deposition at the edge of the coating electrode. After the EPD process is complete, the phosphor layer 6 is deposited on the ITO layer 5 (FIG. 2C). The thickness of the phosphor layer 6 is approximately 40 μm, but may differ for other phosphors.

Finally, the heat sink 8 is attached to the coated optical transmitting member 2 using a heat transfer paste 7 which results in the finished phosphor device 1 shown in FIG. 1. The paste 7 contains $TiO_2$ as filler to add diffuse reflectivity to the thermal properties. For certain applications the phosphor device 1 shown in FIG. 1 but without heat sink or even without reflective means may be appropriate.

Figure 3:
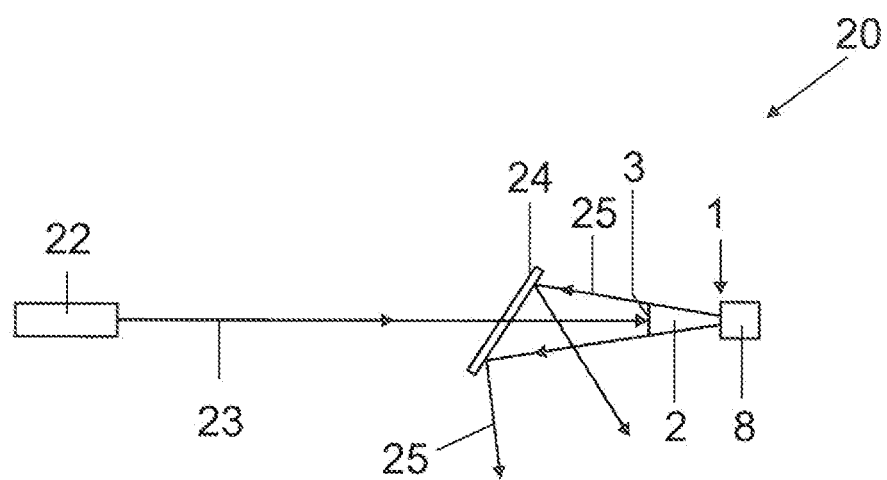
FIG. 3 shows a lighting apparatus including a phosphor device as shown in FIG. 1.

FIG. 3 shows a schematic view of a lighting apparatus 20 including a phosphor device 1 as shown in FIG. 1. The lighting apparatus 20 further includes at least one laser diode 22, emitting exciting light 23 of a wavelength of about 450 nm, and a dichroitic mirror 24 arranged on the optical axis between the laser diodes 22 and the phosphor device 1. For high power applications, the exciting light source may be a laser array with more than 1 W of laser beam power for each laser diode. The exciting light 23 passes through the dichroitic mirror 24, enters the phosphor device 1 through the first end face 3 of the optical transmitting member 2 and is received by the phosphor layer (not shown) EPD-coated on its second face. The light wavelength-converted by the excited phosphor layer is collected and mixed by the optical transmitting member 2. The mixed light exits the first end face 3 of the optical transmitting member 3 and is transmitted to the dichroitic mirror 24. The dichroitic mirror 24 is tilted to reflect the mixed wavelength-converted light off the optical axis defined by the beam of the diode laser 22. Depending on the specific application, e.g. entertainment lighting with coloured, further optical elements may be involved.

While the disclosed embodiments has been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for manufacturing a phosphor device comprising:
   providing an optical transmitting member having a first end face and a second end face, whereby the optical transmitting member is designed for guiding exciting light entering through the first end face onto a phosphor layer arranged on the second end face, whereby at least a part of the exciting light is being wavelength-converted by the phosphor layer, and whereby the optical transmitting member is further designed for at least partially collecting and guiding the light converted by the phosphor layer;
   attaching an optically transparent electrode on the second end face of the optical transmitting member;
   providing a phosphor and a counter-electrode designed for electrophoretic deposition of the phosphor; and
   depositing a phosphor layer on the optically transparent electrode by means of electrophoretic deposition, thereby using the optically transparent electrode as a coating electrode,
   wherein the attaching of the optically transparent coating electrode is performed by coating an optically transparent, electrically conductive layer on the second end face of the optical transmitting member.

2. The method according to claim 1, wherein the thickness of the electrically conductive layer is in the range of several nm to several tenth of nm.

3. The method according to claim 1, wherein the layer comprises tin oxide, indium tin oxide, aluminium zinc oxide, a metal mono layer or graphene.

4. The method according to claim 1, wherein the attaching of the optically transparent electrode is performed by placing a wire mesh on the second end face of the optical transmitting member.

5. The method according to claim 1, further comprising submerging the optical transmitting member with the coating electrode and additionally a counter-electrode into a coating bath, and the latter comprising the phosphor for the phosphor layer.

6. The method according to claim 1, wherein the optical transmitting member comprises an optically transparent and thermally conductive material.

7. The method according to claim 1, wherein the optical transmitting member is designed to transmit light by way of total internal reflection between the first end face and the second end face.

8. The method according to claim 1, wherein the optical transmitting member is elongated and has a polygonal cross section.

9. The method according to claim 1, wherein the phosphor comprises a phosphor component or a phosphor mixture.

10. The method according to claim 1, wherein the optically transparent coating electrode is being separated into adjacent, separately controllable electrode zones, resulting in separated adjacent phosphor zones.

11. The method according to claim 1, further comprising the step of arranging a reflective means on the side of the phosphor layer reverse to the side facing the optically transparent electrode.

12. The method according to claim 10, wherein the reflective means comprises $TiO_2$.

13. The method according to claim 1, further comprising arranging a heat sink on the side of the phosphor layer reverse to the side facing the optically transparent coating electrode.

14. A lighting apparatus comprising:
   a phosphor device manufactured by a method comprising:
      providing an optical transmitting member having a first end face and a second end face, whereby the optical transmitting member is designed for guiding exciting light entering through the first end face onto a phosphor layer arranged on the second end face, whereby at least a part of the exciting light is being wavelength-converted by the phosphor layer, and whereby the optical transmitting member is further designed for at least partially collecting and guiding the light converted by the phosphor layer; attaching an optically transparent electrode on the second end face of the optical transmitting member; providing a phosphor and a counter-electrode designed for electrophoretic deposition of the phosphor; and depositing a phosphor layer on the optically transparent electrode by means of electrophoretic deposition, thereby using the optically transparent electrode as a coating electrode;
   an exciting light source for emitting exciting light;
   wherein the phosphor device and the exciting light source are designed and arranged such that the exciting light is enabled to enter the phosphor device through the first end face of the optical transmitting member,
   wherein the lighting apparatus further comprises an electrically conductive layer on the second end face of the optical transmitting member.

15. The method according to claim 8, wherein the polygonal cross section is a triangular, a rectangular or a hexagonal cross section.

16. The method according to claim 6, wherein the optically transparent and thermally conductive material is $Al_2O_3$, $YVO_4$, YLF or sapphire.

* * * * *